United States Patent [19]

De Sipio et al.

[11] 3,727,142

[45] Apr. 10, 1973

[54] PULSE STREAM NOISE DISCRIMINATOR

[75] Inventors: Richard G. De Sipio, Philadelphia; Thomas F. Long, Warminster; Henry R. Beyer, Chalfont, all of Pa.

[73] Assignee: The United States of America as represented by the Secretary of the Navy

[22] Filed: Dec. 2, 1968

[21] Appl. No.: 781,306

Related U.S. Application Data

[63] Continuation-in-part of Ser. No. 644,439, May 31, 1967.

[52] U.S. Cl. ................................ 328/111, 340/167 A

[51] Int. Cl. ............................ H03k 5/18, H03k 5/20

[58] Field of Search ................. 340/146.1 J, 146.1 D, 340/146.3 ED, 146.1 AJ, 167 A; 328/111

[56] References Cited

UNITED STATES PATENTS

| | | | |
|---|---|---|---|
| 3,593,162 | 7/1971 | Patmore | 328/111 |
| 3,594,585 | 7/1971 | Bourget | 328/111 |
| 3,252,139 | 5/1966 | Moore | 340/146.1 |

*Primary Examiner*—Benjamin A. Borchelt
*Assistant Examiner*—H. A. Birmiel
*Attorney*—Edgar J. Brower and Henry Hansen

[57] ABSTRACT

An apparatus for determining the quality of an input data pulse stream by continuously monitoring each respective pulse thereof for a specified duration. The data pulses are rejected as noise if the duration thereof is less than that of a desired signal and the apparatus provides lock out and clear signals to prevent the data from being processed. If a valid data pulse stream is detected, a clock signal is developed which functions, through other circuitry, to enable a sequence register to accept this data and clock it into appropriate flip-flops therein. In addition, an inhibit signal is developed to prevent the reception of any signals during the processing of the valid data pulse stream. An automatic/manual read control unit functions to clear and then enable a display to read the valid data pulse stream temporarily stored in the sequence register.

14 Claims, 4 Drawing Figures

INVENTORS
Richard G. DeSipio
Thomas F. Long
Henry R. Beyer

BY [signature]
ATTORNEY

PATENTED APR 10 1973 3,727,142

INVENTORS
Richard G. DeSipio
Thomas F. Long
Henry R. Beyer

BY Henry Hansen
ATTORNEY

PULSE STREAM NOISE DISCRIMINATOR

CROSS REFERENCES TO RELATED APPLICATIONS

This application is a continuation-in-part of application, Ser. No. 644,439, filed May 31, 1967.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a noise discrimination technique which may be utilized with the sequence matrix disclosed in the aforementioned parent patent application. More particularly, the present invention is directed toward inhibiting noise from causing false indications to be displayed on the decoder display of the parent application. This is achieved by replacing the shift pulse generator and timing control units of the parent application with the present, vastly improved, noise discriminator.

The sequence matrix of the parent patent application is capable of both receiving a sequence binary word comprising *n* binary events with each event having *m* different states and decoding this information for display or routing purposes to another system. Additionally, while the sequence matrix provides some degree of noise suppression and discrimination, it has been found that when it is utilized in a noise environment or is exposed to jamming it becomes possible to "-fool" the sequence register thereof such that false indications are provided to the decoder display.

There thus has arisen a need for a noise discriminator which can be incorporated in the sequence matrix and which eliminates the possibility of false indications being displayed or routed to other systems.

SUMMARY OF THE INVENTION

Accordingly, it is the general purpose of the present invention to provide noise discrimination circuitry which monitors, for prescribed time periods, incoming data to the sequence register of the parent application and which further locks the register until an enable signal is provided thereto so that the probability of a false indication being displayed as desired data is considerably minimized.

The invention is an unconventional approach to logic design in that it is a self-clocking system wherein each data pulse is monitored, not sampled. Thus there is no internal oscillator, a clock being developed from the input data itself, and positive and definitive signal-to-noise determination is achieved.

The invention comprises a data insert unit which receives an input data pulse stream and, if certain logic criteria are present, provides a replica of the stream to a monitoring unit. The monitoring unit ascertains whether or not each of the pulses of the data pulse stream is of sufficient duration and therefore not noise. If it is determined that a pulse is a noise signal, a clear signal is developed to maintain the sequence register in a locked state and to energize an interval inhibit unit which provides an inhibiting signal to the data insert unit thereby preventing it from receiving any further information. If, however, the monitor ascertains that a valid data pulse has been received, it provides an energizing or true pulse signal to a clock pulse generator. The clock pulse generator provides an inverted clock pulse which functions to enable an enable/clear unit so that it may unlock the sequence register. Additionally, the inverted clock pulse is routed to the register so that it may begin clocking in the valid data pulse and is further routed to the interval inhibit unit which again inhibits the data insert unit form accepting data for a predetermined time period. This inhibiting function ensures that noise is precluded from being passed during the time when the valid data pulse is being processed. The inverted clock pulse is also routed to a read control unit which provides either a read or clear signal to a visual display depending upon whether or not the display has information displayed thereon. If the display lamp is lit, the read control unit first clears the display of this information and then sends a read signal thereto. In this manner the read control unit continuously updates the display information. Additionally, manual means are provided whereby data may be displayed as long as is desired.

DESCRIPTION OF THE PREFERRED EMBODIMENT

Figure 1:
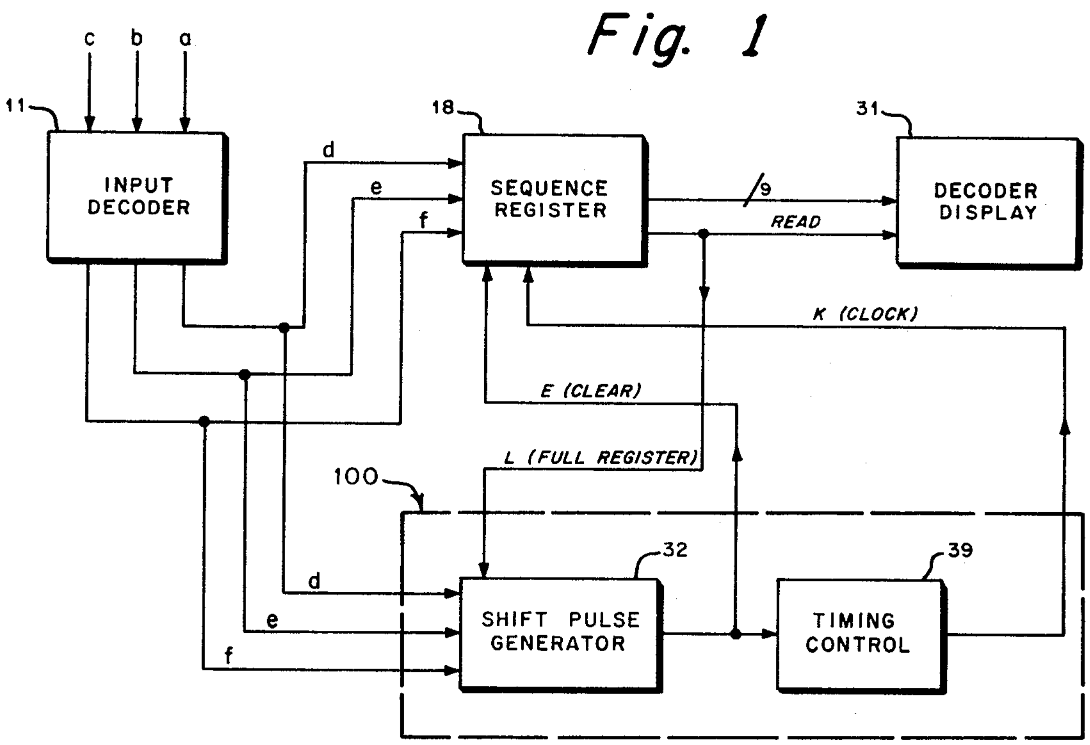
FIG. 1 is a simplified block diagram of the sequence matrix disclosed in the parent application.

Referring now to the drawing and more particularly to FIG. 1 thereof, there is shown an input decoder 11 which may be an exclusive-OR network and which receives input pulse stream data along the lines *a*, *b*, and *c*. The logic 11 permits only one output to be derived on only one output line during a particular time interval. Moreover, to obtain this condition there can only be a logical "1" input on one input line during the particular time interval. If more than one logical "1" appears at the same time on the input lines there will be no output from the decoder. Thus, the function of the input decoder is to provide an output on a particular line (*d*, *e*, and *f*) only when a logical "1" appears on a particular input line and logical "O's" appear on the other input lines. If the above criteria are met, data pulses on either lines *d*, *e*, or *f* are fed simultaneously to the sequence register 18 and the shift pulse generator 32.

As disclosed in the parent application, if the register were initially empty the shift pulse generator 32 determined, through the use of a three input OR gate 33 having a capacitor 35 connected to the output thereof, if the incoming data were noise or true signal. That is, the capacitor 35 operated to suppress transient noise signal and further required the data received from the OR gate 33 to have a pulse width greater than the time needed to charge the capacitor, 500 microseconds being chosen as the optimum charging time due to the need for compatibility between the discreet capacitor and the microcircuits utilized. This need for compatibility thus constrained the noise suppression capability of the system.

If the data passed the 500 microsecond test, the timing control 39 provided a clock pulse along the line *k* which enabled the sequencer 18 to clock in the data. When a full register was reached, the display 31 read the code simultaneously with the register 18 providing a lock out signal to the shift generator 32 along the line L. The shift generator 32, responsive thereto provided a clear signal along the line E to the sequence register 18 so that a new set of data could be received. A more detailed description of FIG. 1 is provided in the parent application.

Figure 1A:
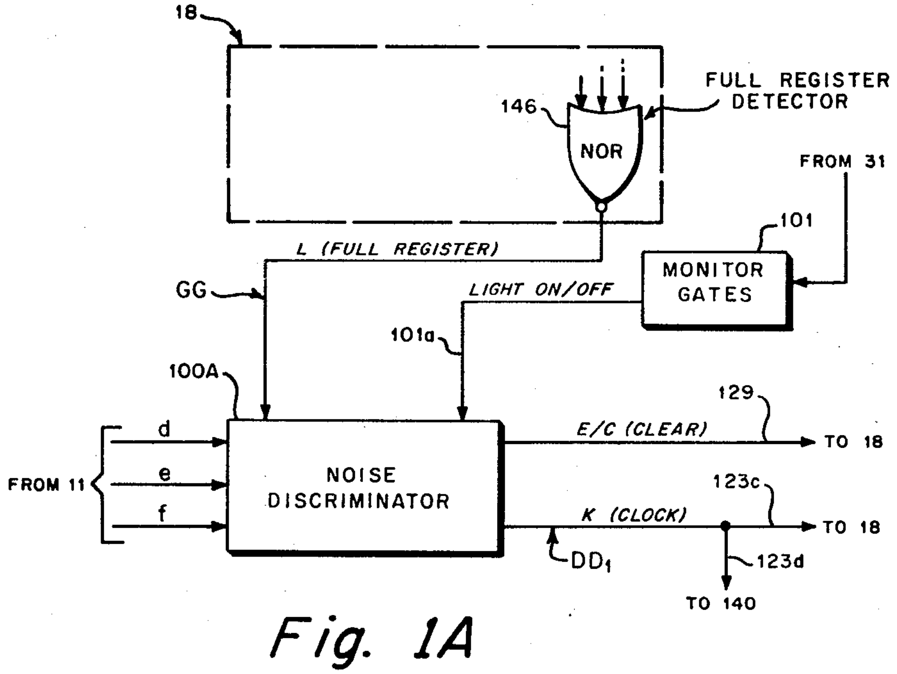
FIG. 1*a* is a block diagram of the noise discriminator in accordance with the present invention showing the interconnections therewith with the sequence matrix of FIG. 1.
Figure 2:
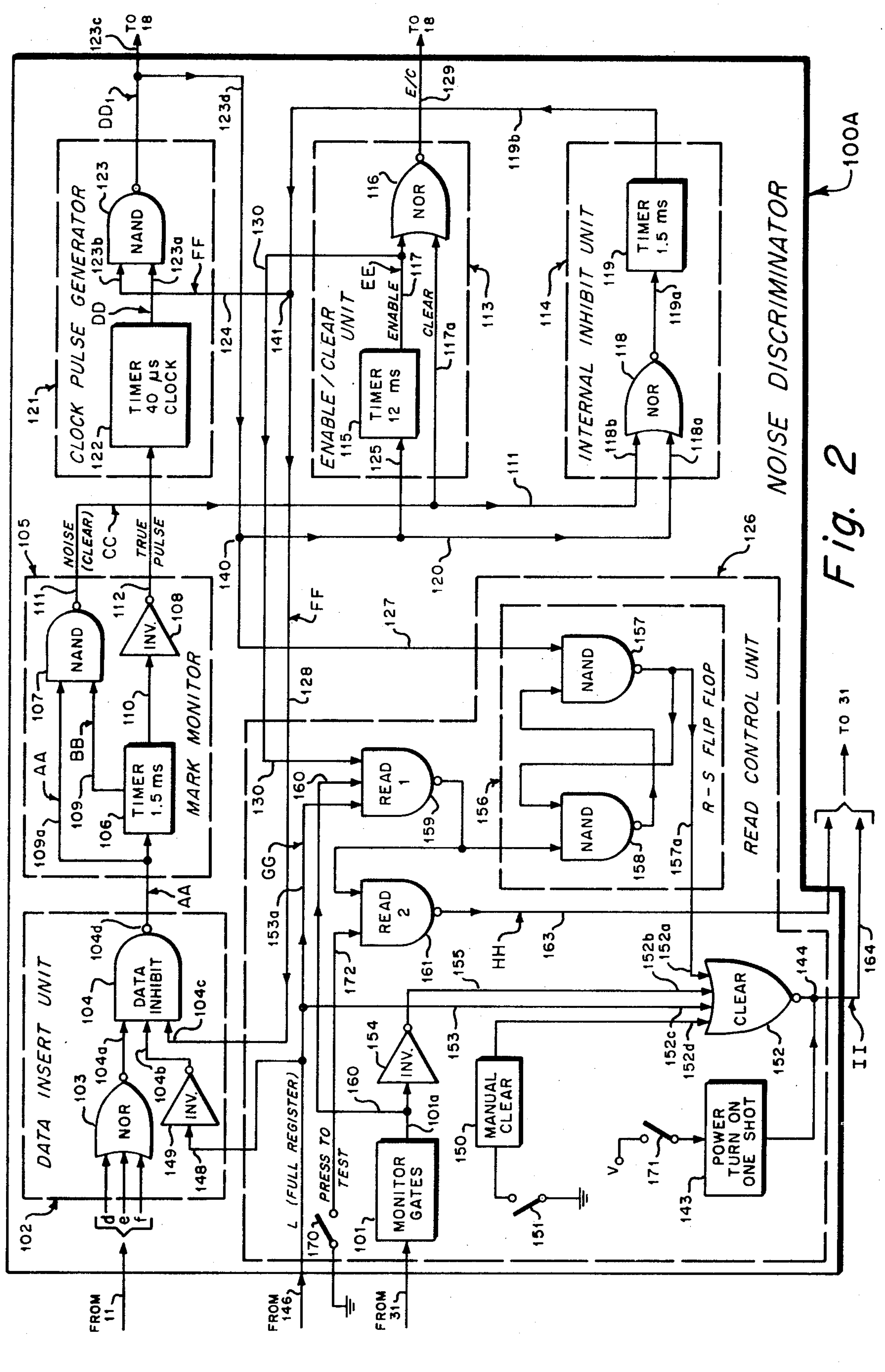
FIG. 2 is a schematic logic diagram showing the various logic components and their functional block diagram representations in accordance with the invention.

Referring now to FIGS. 1*a* and 2, the noise discriminator in accordance with the invention will be explained. From a comparison of FIGS. 1 and 1*a*, it is seen that the noise discriminator 100*a* replaces the shift pulse generator 32 and timing control 39 (shown in the block labeled 100, FIG. 1). Noise discriminator 100*a* receives an input data pulse from the input decoder 11 along the lines *d*, *e*, *f*, and additionally provides an enable or clear signal to the sequence register 18 as well as a clock signal thereto. The noise discriminator 100*a* also receives a full register signal via the line L from the sequence register 18, through a gate 146 discussed hereinafter, as well as an ON-OFF signal from the display 31 through a plurality of monitor gates 101 which provide a control signal to the noise discriminator coded to indicate either the presence or absence of a light on the display. This will be disclosed more fully hereinafter.

Referring now to FIG. 2 there is shown in greater detail the noise discriminator 100*a*. The discriminator 100*a* includes a data insert unit 102 which comprises a three-input NOR gate 103 the output of which is connected to input 104*a* of a three-input NAND gate 104 labeled "data inhibit." The output 104*d* of data inhibit gate 104 is connected to a mark monitor 105 which includes a 1.5 millisecond timer 106, a two-input NAND gate 107, and an inverter 108. The timer 106 receives the output pulses from the data inhibit gate 104 as does the NAND gate 107, via line 109*a*. Additionally, the timer provides a positive pulse of 1.5 milliseconds to the NAND gate 107 via line 109 and a 1.5 millisecond negative pulse to the inverter 108 via the line 110. The mark monitor 105 has two general outputs, one from the NAND gate 107 along line 111 labeled "noise (clear)" and the other along line 112 labeled "true pulse." The noise (clear) line 111 feeds both an enable/clear unit 113 and an interval inhibit unit 114. More particularly, the enable/clear unit 113 comprises a 12 millisecond timer 115 and a two-input NOR gate 116. The noise (clear) line 111 provides one of the inputs to the two-input NOR gate 116 via line 117*a*, while the timer 115 provides the second input, via line 117, this being a 12 millisecond positive pulse. These inputs, 117*a* and 117, are labeled clear and enable, respectively.

The interval inhibit unit 114 comprises a two-input NOR gate 118, having input terminals 118*a* and 118*b*, which feeds a 1.5 millisecond timer 119 at its input 119*a*. The NOR gate 118 receives at input 118b the noise (clear) signal along the line 111. Input 118a receives a clock signal along the line 120. This clock signal is derived from clock pulse generator 121 as will now be described.

As noted hereinabove the line 112 is the true pulse line. This line feeds the clock pulse generator 121 and, more particularly, feeds a 40 microsecond clock pulse timer clock 122, the output of which is connected to input 123*a* of a two-input NAND gate 123. The second input, 123*b*, is fed from timer 119 via line 119*b*, point 141 and line 124. NAND gate 123 inverts the clock pulse and feeds timer 115 of the enable/clear unit 113 via line 123*d*, point 140, and line 125. In addition, gate 123 provides the inverted clock pulse via line 123*d*, point 140 and the line 120 to NOR gate 118 at the input terminal 118*a* thereof. Further, the sequence register 18 receives the inverted clock pulse via line 123*c* and a read control unit 126 receives this pulse via line 123*d*, point 140, and line 127.

It is noted that the timer 119 of the interval inhibit unit 114, in addition to providing a signal to NAND gate 123, further provides a signal via line 119*b*, point 141 and the line 128 to input 104*c* of three-input data inhibit gate 104. The third-input to gate 104 is derived from the sequence register 18 through an inverter 149 and gate 146 (FIG. 1). The NOR gate 116 provides an enable or clear signal (as will be hereinafter described) to the sequence register 18 via the line 129 while the timer 115 provides an enable signal to the read control unit 126 via the line 130.

The read control unit 126 comprises a power one-shot 143 operatively connected through a switch 171, which may be manual, to a source of voltage supply V. The output of this one-shot is connected to a point 144 at the output of a four-input NAND gate 152 labeled "-clear." The inputs 152*a–d*, inclusive, of gate 152 are derived from, respectively, the output of an R-S flip-flop 156, via line 157*a;* the display 31 via monitor gates 101, line 101*a*, an inverter 154, and line 155; the register 18 via gate 146 and line 153; and a manual clear control unit 150 connected at its input end to a grounded switch 151.

The flip-flop 156 comprises two two-input NAND gates 157 and 158, gate 157 receiving the inverted clock pulse via the line 127 discussed heretofore and the output from gate 158. Additionally, gate 158 receives an output from gate 157 and further receives an output from a three-input NAND gate 159 labeled "$read_1$ gate." The inputs to $read_1$ gate 159 are derived from, respectively, the sequence register 18 via gate 146 and the line 153*a;* the display 31 via monitor gates 101, line 101*a*, and line 160; the timer 115 via the line 130. In addition to being connected to an input of NAND gate 158, the output of $read_1$ gate 159 is further connected to the input of a two-input NAND gate 161 labeled "$read_2$ gate." The second input to this gate is connected to ground through a normally open press to test manual switch 170 and the line 172. The outputs of both $read_2$ gate 161 and clear gate 152 are routed to the display gate 31 via, respectively, lines 163 and 164.

Figure 3:
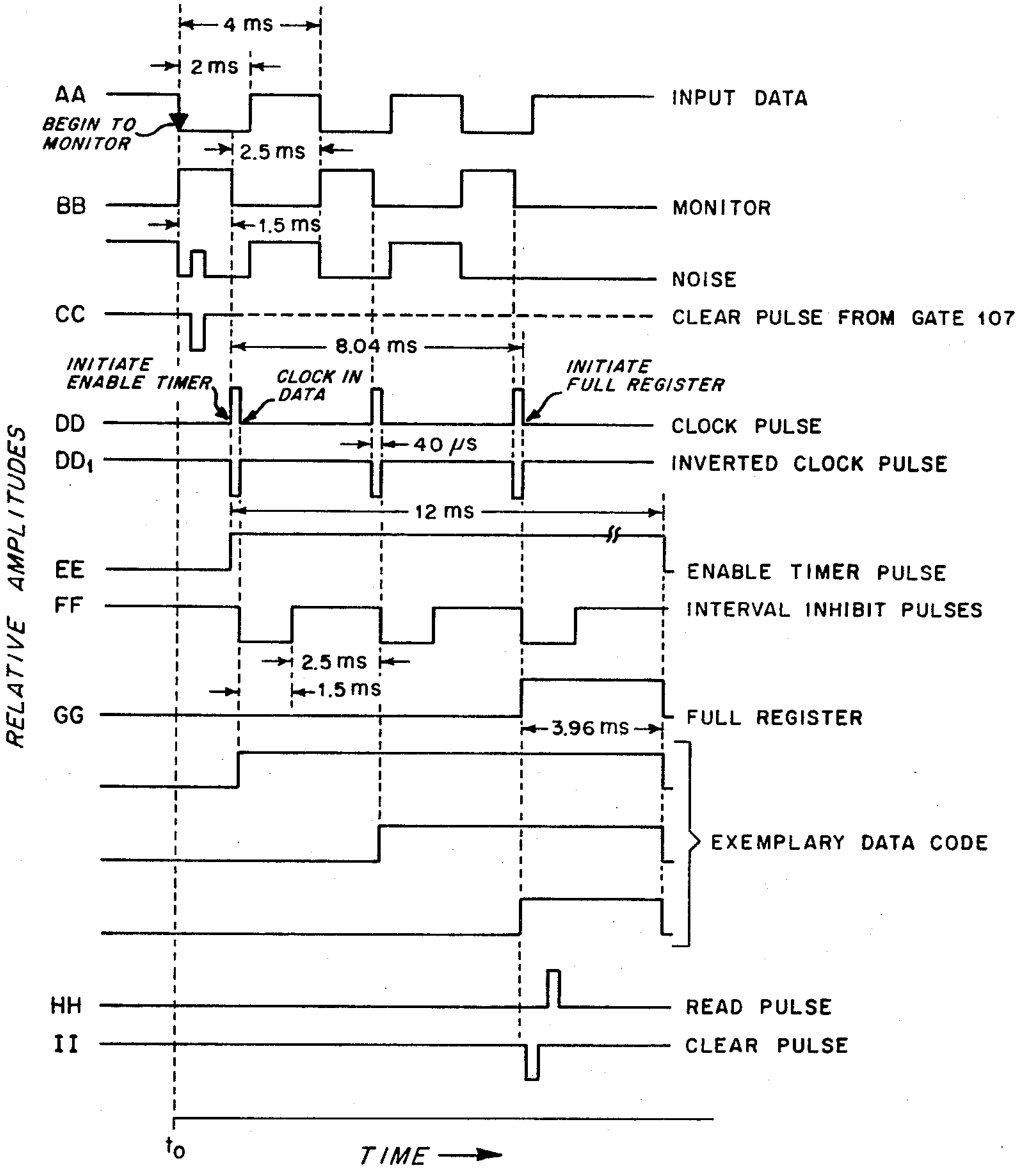
FIG. 3 is a timing diagram showing both the waveforms generated by the noise discriminator in accordance with the invention and an exemplary data code generated by the sequence register of the parent application.

The operation of the system will be described with particular reference to FIGS. 2 and 3. As can be ascertained from the parent patent application the inputs on lines *d*, *e*, and *f* are a function of the following logic equations.

$$d=a\bar{b}\bar{c}. \quad (1)$$

$$e=b\bar{a}\bar{c}. \quad (2)$$

$$f=c\bar{a}\bar{b}. \quad (3)$$

Thus the output from the input decoder 11 (FIG. 1) is derived on only one output line during a particular time interval.

Assuming these conditions to be met, an output will issue from NOR gate 103. At this point, it should be noted that the invention utilizes negative NAND or, alternatively, positive NOR logic. Accordingly, the presence of a low pulse along the lines *d*, *e*, and *f* enables the NOR gate 103 to provide a high output. Data inhibit gate 104 will provide a low output pulse stream which is a replica of the *d*, *e*, and *f* pulses, if the other inputs thereto are also high. The sequence register 18 is in a locked state and cannot process the pulses on lines *d*, *e*, and *f* until it is enabled by enable/clear unit 113. When locked, it will provide a low output pulse at the output of NOR gate 146. Thus, data input gate 104 has thereon a high output pulse at points **104*a* and 104*b*, from respectively, NOR gate 103 and register 18 via NOR gate 146 and inverter 149. The third input 104*c* has a high pulse thereon as the timer 119 of interval inhibit unit 114 is normally in the high state until energized by a pulse from NOR gate 118 (as will be hereinafter described). Accordingly, if the aforementioned logic equations are met, a low output replica data pulse stream will issue from gate output 104*d***.

For purposes of illustration it was assumed that, ideally, each data pulse is of 2 milliseconds duration with a 2 millisecond spacing between successive pulses. In practice, these pulses may vary by approximately 200 microseconds in either direction. Therefore, the data, if a pulse is present on lines *d* and *e* and *f*, will appear nominally as shown at line AA of FIG. 3 but it should be understood that some variance therein may be present.

This data is fed to mark monitor 105 which continuously monitors each duration and provides either a noise (clear) or true pulse signal depending upon whether or not the duration of the particular data pulse exceeds 1.5 milliseconds. The timer 106 receives the replica data pulse stream and provides positive going pulses responsive thereto for 1.5 milliseconds, with 2.5 milliseconds spacing therebetween. These timed pulses, shown at BB, are fed along the line 109 to NAND gate 107. Simultaneously, NAND gate 107 receives the replica data pulse stream along the line **109*a*. As can be seen from a comparison of waveforms AA and BB, the timer 106** begins to generate its time window responsive to the negative going edge (shown with an arrow) of the data pulse AA.

The timer 106 provides negative going pulses also of 1.5 millisecond duration with 2.5 millisecond spacing therebetween to timer 122 of clock pulse generator 121 through an inverter 108. The inverter 108 is necessary as the internal logic of both timers 106 and 122 require that sharp, well-defined pulses be supplied thereto and, accordingly, error might result if, for example, timer 122 received the same pulse as does NAND gate 107 via the line 109.

NAND gate 107 will provide a low output pulse only if the two input pulses thereto are high. Since any particular data pulse is low and the corresponding pulse from timer 106 is high, this condition should not be met. However, if noise should appear during the 1.5 millisecond period that the data pulse is being monitored (as, for example, can be seen from the waveform so labeled) then the presence of two positive going pulses will cause NAND gate 107 to provide the output pulse CC thereby indicating that noise has been detected and that the system should therefore be cleared.

It is noted that if a sampling technique were being utilized, it is conceivable that the noise pulse would be of lesser duration than the time between pulse samplings so that the noise pulse is completely missed and the sampled pulse is permitted to pass as a valid data pulse. Thus the advantages of a continuously monitoring system becomes evident. Also, merely by changing the duration of the timer 106, monitoring of the data pulse may be effectuated for greater or lesser time periods, as desired. A monitoring time of 75 percent of the expected valid data pulse duration was here chosen for illustrative purposes only.

Clearing of the system is determined as follows. The pulse CC travels down the line 111 to input **118*b* or NOR gate 118. Additionally, the pulse from timer 106 through inverter 108 functions to energize timer 122 such that a clock pulse of 40 microseconds is developed. This positive going pulse, in addition to the positive going output of timer 119 (as noted heretofore), enables NAND gate 123 to provide a negative going pulse along the line 123*d* to the point 140 and, from there, along the line 120 to the second input 118a of NOR gate 118. Accordingly, a positive pulse is developed by gate 118. This enables timer 119. Upon being so enabled, timer 119 provides a low pulse along the line 119*b* to the point 141**.

From point 141, this pulse is routed via line 128 to data inhibit gate 104 at input **104*c* and via line 124 to NAND gate 123 at input 123*b*. This low pulse along the line 128 functions to inhibit the data input gate 104 for the duration of the pulse. This has been set at 1.5 milliseconds. This low pulse also functions to inhibit NAND gate 123 so that no further clock pulses may be developed. Additionally, the pulse CC enters NOR gate 116, via line 117*a*, of enable/clear unit 113. Responsive thereto, gate 116 provides a clear signal to the sequence register 18** to clear any data which may otherwise be processed thereby.

If, however, no noise is detected during the 1.5 millisecond monitoring period, the positive going pulse issuing from inverter 108 of mark monitor 105 is deemed to be a true pulse. That is, this pulse indicates that no noise has been detected during the 1.5 millisecond period and therefore the monitored pulse is a valid data pulse. This true pulse functions to enable the 40 microsecond clock pulse timer 122. This timer provides the positive going clock pulse waveform DD which is inverted by NAND gate 123 (since the input at **123*b* is also high) and performs the following four functions. The inverted clock pulse is first routed, via the line 125 (from point 140 and line 123*d*), to 12 millisecond timer 115 of the enable/clear unit 113. This timer provides a positive going 12 millisecond pulse which is inverted by NOR gate 116 and is routed via line 129 as an enabling pulse to unlock or "free up" the register 18 so that it may begin accepting data. Also, before being inverted, the positive going 12 millisecond pulse is routed via line 130 to $read_1$ gate 159 of read control unit 126. This unit will be discussed more fully hereinafter. Once the register 18 has been unlocked, the inverted clock pulse is routed via line 123c to the register 18 so that it may begin to clock in the valid data pulse. Additionally, the inverted clock pulse is routed via line 120 (from point 140 and line 123d) to NOR gate 118. This gate inverts the pulse thereby enabling timer 119 of the interval inhibit unit 114 to provide inhibit pulses both to the data inhibit gate 104 and to the NAND gate 123 in the manner heretofore described. The purpose of this is to inhibit the system from accepting any further data for a period of 1.5 milliseconds. Thereafter the system is again opened or enabled so that it may act upon the occurrence of the next input signal. The system is inhibited for two reasons. First, since a valid data pulse has been received there is no further need to accept information as the next valid data pulse should not occur within 2 milliseconds of the previous pulse. Accordingly, the inhibit signal received at 104c of gate 104 locks out any noise which may otherwise function to upset the processing system. Secondly, the next clock pulse is prevented from being developed for at least 1.5 milliseconds to ensure that there is a pulse spacing of at least 1.5 milliseconds. Thus, once a clock pulse has been generated the system is precluded from generating another until the proper time when another valid data pulse is expected to be present. The fourth function of the inverted clock pulse is to enable flip-flop 156 of read control unit 126 upon being routed thereto via the line 127, point 140, and line 123d**.

It should be noted that the output of timer 115 is connected directly, through NOR gate 116, to the clear line of the sequence register 18. Thus, once this timer has been triggered it will unlock the system for a period of 12 milliseconds and, in the absence of being triggered, will ensure that the register is in a locked condition. It is during this 12 millisecond period (waveform EE) that the complete data processing cycle must take place. If, for example, there occurs a first valid data pulse but the next received or second pulse of the three pulse group is a pulse having a duration of less than 1.5 milliseconds, while the first pulse functions to open the system and insert a "1" into the appropriate flip-flop of register 18, the second, non-valid pulse functions to generate a clear pulse as discussed hereinabove along the line 111. This means that although the system was opened by the first pulse it can immediately be cleared by the detection of an invalid condition. However, the 12 millisecond timer 115 will continue to run its time period and at the completion of 12 milliseconds will again lock the system.

Should three valid input data pulses occur, however, then, responsive to each respective valid pulse a true pulse will be generated each, in turn, causing a 40 microsecond inverted clock pulse to be produced. Each time such an inverted clock pulse is produced, the sequence register 18 will clock in the respective valid data pulse. This is explained fully in the aforementioned parent application. However, for purposes of illustration only, in FIG. 3 under the legend "exemplary data code" there is shown a representative situation wherein the flip-flops 25, 26, and 27 of the sequence register 18 as shown in FIG. 1 of a parent patent application have clocked in thereto valid data input pulses. This exemplary data code may be "ORed" as in the parent application by three-input OR gate 55 connected at its output to an inverter 56 or, alternatively, by three-input NOR gate 146 (FIG. 1) so that a pulse GG (L full register) is generated indicating that a full register has been detected. This detected pulse lasts for 3.96 milliseconds since it is terminated when the enable timer pulse 115 (waveform EE) reaches the end of its 12-millisecond period and turns off(thereby clearing the sequence register 18) and the time between the initiation of the first clock pulse and the termination of the third clock pulse (waveform DD) is 8.04 milliseconds. In addition, the 3.96-millisecond full register pulse GG is routed via line 148 through an inverter 149 to provide a low pulse at the input 104b of data inhibit gate 104 thus functioning to lock out any noise which might otherwise occur during the 3.96-millisecond period.

The read control unit 126 will now be explained. It is first noted that this unit may be either manually or automatically operated. In the manual mode, information on the display remains therefore as long as is desired irrespective of other conditions. In the automatic mode, each subsequent valid data pulse is operative (as will be hereinafter described) to continuously update displayed information.

The clear gate 152 requires the coincidence of four high input signals thereto before a low output is provided thereby. Since one of the inputs to clear gate 152 is from the sequence register 18 via the gate 146 (FIG. 1) and line 153, a high pulse will be presented thereto only when the register is full. Accordingly, while the reception by the read control unit 126 of the first and second generated clock pulses may provide a high input to clear gate 152 as will become evident hereinafter, the absence of a full register condition inhibits the gate and no output issues therefrom. Upon the reception of the third clock pulse (via lines 123d, point 140 and line 127) by NAND gate 157 of R-S flip-flop 156, however, there simultaneously is supplied the full register pulse GG from gate 146 to both the clear gate 152 (via the line 153) and the $read_1$ gate 159, via the line 153a.

The purpose of the R-S flip-flop 156 is to provide a latching action which will ensure that the clear gate 152 is inhibited during the read portion of the timing sequence. This function is necessary because the detected full register pulse GG is simultaneously applied, as noted hereinabove, to the clear gate 152 and the $read_1$ gate 159 for a 3.96-millisecond period. Therefore, some control is required to ensure against a free-running clear/read repetitive sequence. However, as will be disclosed hereinafter, once the flip-flop 156 is latched to inhibit the clear gate 152, only the reception of a valid 2-millisecond signal can unlatch the gate via the inverted clock pulse supplied to NAND gate 157.

Thus, the first inverted clock pulse, upon being supplied to NAND gate 157 causes the gate to provide a high output along the line 157a to input terminal 152a of clear gate 152. The 3.96-millisecond full register pulse GG is supplied to terminal 152*c* of gate 152 simultaneously with being supplied via line 153*a* to $read_1$ gate 159. If a light is on in the display (i.e., if data is being displayed) then the voltage causing the light is sensed by monitor gates 101 which provide a low output responsive thereto along the line 101*a*. This low output is inverted by inverter 154 and supplied to input terminal 152*b* of clear gate 152 via the line 155 thereby providing a high signal thereto. However, since a low signal is provided by the monitor gates 101, a low signal is provided along the line 160 to $read_1$ gate 159 thereby inhibiting that gate even though both the full register pulse GG and the enable pulse EE presented thereto are high. The fourth high provided to clear gate 152 is derived from manual clear unit 150 which normally provides a high output and goes low only upon the closure of switch 151 which, it will be noted, is tied to ground. Accordingly, with four high signals present at the input to gate 152 the following generalizations can be made. Firstly, there is present valid data in the full register; secondly, the system is operating in the automatic rather than manual mode; and thirdly, a light is on in the display unit 31.

Responsive to the four high input conditions, a low output issues from clear gate 152 (waveform II) and is fed to the display to clear or put out the light present thereon. As soon as this occurs, monitor gates 101 sense that the light has gone out and, responsive thereto, provide a high output along line 101*a*. This high is inverted by inverter 154 to provide a low at input terminal 152*d* of gate 152 thereby inhibiting the gate. However, this high is also routed via line 160 to $read_1$ 159 which now has highs at all three inputs (the other two highs being derived from, respectively, the full register pulse GG and the enable timer pulse EE). Accordingly, $read_1$ gate 159 provides a low pulse simultaneously to both $read_2$ gate 161 and NAND gate 158. Responsive thereto, NAND gate 158 goes high causing NAND gate 157 to go low thereby further inhibiting clear gate 152 since NAND gate 157 now provides a low signal to input terminal 152*a* thereof. This low signal will last for the duration of the full register pulse GG as, irrespective of the conditions on the other input terminals of gate 152, input terminal 152*a* will remain low until NAND gate 157 of R-S flip-flop 156 is hit with another inverted clock pulse. Thus the clear gate 152 is locked out for the duration of the timing sequence.

Since the pulse from $read_1$ gate 159 additionally feeds $read_2$ gate 161 and the other input to date 161 is normally high (but can be made low by pressing the press to test switch 170 as will be discussed hereinafter), a high read pulse (waveform HH) is provided by $read_2$ gate 161 via line 163 to the display 31. This pulse enables the display to read the data code temporarily stored in the sequence register 18 and, upon so reading, function to light a light thereon. It is noted that even though this lighting is sensed by monitor gates 101 and a high signal is therefore provided to clear gate 152 (at input 152*b* thereof) the low signal present at input terminal 152*a* inhibits the gate from clearing the display. The display may be cleared, however, upon the reception by gate 157 of an inverted clock pulse. This places a high on clear gate 152 as discussed hereinabove.

Should it be desired to operate the system in the manual mode so that data displayed on the display 31 will remain there for a period determined by the operator (rather than by the occurrence of the next valid pulse), it is necessary only to close switch 151. This causes manual clear unit 150 to provide a low signal at terminal 152*d* of clear gate 152 thereby in effect inhibiting the clear gate so that the display 31 is never cleared, irrespective of the other input signals supplied to the gate 152.

It should further be noted that at equipment turn-on, to ensure that the display 31 is initially clear, power turn on one-shot 143 may be activated by the closure of switch 171 connected to a source of supply V. This functions to provide a negative going or low pulse from the output of one-shot 143 to the point 144 at the output of clear gate 152. This dot-OR function thus provides the negative going pulse necessary to clear the display. Once the display has been cleared, and in order to check the operation thereof, it is possible by depressing press to test switch 171 to provide a low signal to $read_2$ gate 161 via the line 172. Responsive thereto, $read_2$ gate 161 will provide a high to the display and light all the lights thereon. This can be then cleared by a second application of the power one-shot 143, or by manual clear 150.

In conclusion, it is to be noted that the present invention may be utilized with any digital binary system which accepts a serial data stream with a return to zero data pulse configuration. One need only change the time constants within the respective timers to accommodate the data pulse duration being monitored. This is quite readily accomplished as all of the respective timers may comprise monostable multivibrators with external, variable, R-C time constant control. One such timer is manufactured by Fairchild, Inc., under the part number designation TTμL9601. It should further be noted that this monitoring technique provides added communication confidence over and above the normally employed parity, validity, and correction codes confidence techniques normally utilized with return to zero digital systems.

Accordingly, as many modifications and variations of the present invention are obviously possible in the light of the above teachings, it is therefore to be understood that within the scope of the appended claims the invention may be practiced otherwise than as specifically described.

What is claimed is:

1. A noise discriminator, comprising:

data insert means receiving an input data pulse stream and providing an output replica thereof in the absence of the receipt of an inhibiting signal;

first means operatively connected to receive said replica for providing a first series of pulses of predetermined duration and a second series of pulses of like predetermined duration, said first series of pulses and said second series of pulses being of opposite polarity;

monitoring means operatively connected to receive said replica and said first series of pulses for monitoring each pulse of said replica for predetermined time periods and providing a signal indicative of a noise condition if any of said replica pulses changes state during said monitoring time periods; and logic circuit means operatively connected to receive said signal indicative of a noise condition and said second series of pulses for providing an inhibitory signal to said data insert means.

2. A noise discriminator according to claim 1, wherein:

said first means comprises first timing means and an inverting means operatively connected thereto;

said first series of pulses are provided by said timing means as a first series of positive going pulses;

said second series of pulses are provided by said timing means and are negative going pulses, whereby said inverting means inverts said negative going pulses to thereby provide a second series of positive going pulses; and said monitoring means comprises a first logic gate operatively connected to said first timing means and receiving therefrom said first series of positive going pulses for monitoring said replica pulses received thereby.

3. A noise discriminator according to claim 2, wherein said data insert means comprises:

a second logic gate receiving said input data pulse stream; and a third logic gate having at least two input terminals operatively connected at one of the input terminals thereof to the output of said second logic gate for providing said replica in the absence of receiving the inhibitory signal at the other of said input terminals.

4. A noise discriminator according to claim 3, wherein said logic circuit means comprises:

second timing means operatively connected to the output of said inverting means for providing clock pulses responsive thereto; and a fourth logic gate having at least two input terminals and operatively connected at one input terminal thereof to said second timing means for inverting said clock pulses.

5. A noise discriminator according to claim 4, wherein said logic circuit means further comprises:

third timing means operatively connected to the output of said fourth logic gate for providing a timing pulse responsive to the receipt of the first of said inverted clock pulses; and a fifth logic gate operatively connected to said third timing means and responsive to said timing pulse for providing an enable signal.

6. A noise discriminator according to claim 5, wherein:

said fifth logic gate is further operatively connected to said first logic gate for providing a clear signal responsive to the receipt of said signal indicative of a noise condition.

7. A noise discriminator according to claim 6, wherein said logic circuit means further comprises:

a sixth logic gate operatively connected to said first logic gate and said fourth logic gate for providing an energizing pulse responsive, respectively, to the receipt of said signal indicative of a noise condition or said inverted clock pulses; and fourth timing means for providing said inhibitory signal to said third logic gate in response to the receipt thereto of said energizing pulse.

8. A noise discriminator according to claim 7, wherein said logic circuit means further comprises:

a seventh logic gate for providing a clear pulse upon the coincidence of like state logic input signals supplied to the input terminals thereof;

flip-flop means receiving said inverted clock pulses and operatively connected to said seventh logic gate for supplying a logic input signal to one of the inputs thereof;

an eighth logic gate receiving said timing pulse from said third timing means and providing an output pulse upon the coincidence of the receipt thereto of at least another pulse of like logic state as said timing pulse; and a ninth logic gate receiving said output pulse and providing a read pulse responsive thereto.

9. A noise discriminator according to claim 8, wherein:

said eighth logic gate further provides said output pulse upon the coincidence of like state logic input pulses supplied thereto to said flip-flop means to change the state thereof.

10. A noise discriminator according to claim 9, further comprising:

sequence register means simultaneously providing a pulse indicative of a full register condition to said seventh logic gate and said eighth logic gate;

means providing a control logic signal of a first logic state to said seventh logic gate and a like control logic signal of a second logic state to said eighth logic gate, said eighth logic gate providing said output pulse when said first logic state is the same as that of said pulse indicative of a full register condition and that of said timing pulse from said third timing means.

11. A noise discriminator according to claim 10, wherein:

said seventh logic gate provides said clear pulse when said second logic state is the same as that of said logic input signal and that of said pulse from said sequence register means.

12. A noise discriminator according to claim 11, further comprising:

means connected to said third logic gate for inhibiting said gate responsive to the receipt of said pulse indicative of a full register condition.

13. A noise discriminator according to claim 12, further comprising:

means for supplying a signal to said ninth logic gate which, responsive thereto, provides said read pulse irrespective of the presence or absence of other signals.

14. A noise discriminator according to claim 13, further comprising:

manual means supplying a signal to said seventh logic gate to inhibit said gate from providing said clear pulse for an externally determined time period; and means connected to the output of said seventh logic gate for providing yet another clear pulse irrespective of the presence or absence of signals supplied to said seventh logic gate.

* * * * *